(12) United States Patent
Gravelle et al.

(10) Patent No.: US 10,210,752 B2
(45) Date of Patent: *Feb. 19, 2019

(54) RFID SYSTEM WITH TIME SLOT INTERLEAVING

(71) Applicant: AMTECH SYSTEMS, LLC, Albuquerque, NM (US)

(72) Inventors: Kelly Gravelle, Poway, CA (US); Michael Melville, Albuquerque, NM (US); Karl Kelsey, Albuquerque, NM (US)

(73) Assignee: AMTECH SYSTEMS, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,838

(22) Filed: Mar. 16, 2017

(65) Prior Publication Data

US 2017/0186312 A1    Jun. 29, 2017

Related U.S. Application Data

(63) Continuation of application No. 14/559,038, filed on Dec. 3, 2014, now Pat. No. 9,633,328, which is a continuation of application No. 13/464,542, filed on May 4, 2012, now Pat. No. 8,928,462.

(60) Provisional application No. 61/483,568, filed on May 6, 2011.

(51) Int. Cl.
    G06K 7/10      (2006.01)
    H04Q 5/22      (2006.01)
    G08G 1/00      (2006.01)
    G08G 1/017     (2006.01)

(52) U.S. Cl.
    CPC ......... G08G 1/017 (2013.01); G06K 7/10019 (2013.01); G06K 7/10029 (2013.01); G06K 7/10039 (2013.01); G06K 7/10356 (2013.01); G06K 7/10366 (2013.01)

(58) Field of Classification Search
    CPC ................... G06K 7/0008; G06K 19/0723
    USPC ............... 340/10.1–10.5, 928, 933; 342/42; 370/329
    See application file for complete search history.

(56) References Cited

U.S. PATENT DOCUMENTS

| | | |
|---|---|---|
| 5,525,991 A | 6/1996 | Nagura |
| 5,686,920 A | 11/1997 | Hurta et al. |
| 5,952,940 A * | 9/1999 | Matsumoto ............ G08G 1/017 340/905 |
| 6,052,068 A | 4/2000 | Price R-W et al. |

(Continued)

*Primary Examiner* — Nam V Nguyen
(74) *Attorney, Agent, or Firm* — Snyder, Clark, Lesch & Chung, LLP

(57) ABSTRACT

A method for interleaving time slots in a multi-antenna system for communication with RFID tags is disclosed. An example is shown for an eight antenna system. A first four antennas arranged side-by-side are sequentially energized to interrogate RFID transponders. A second set of four antennas arranged side-by-side, the first of which is adjacent to the last of the first set of antennas. A four-antenna sequence is performed for the first four antennas and a second four antenna sequence is performed for the second set of antennas. The first and second four antenna sequences are offset by only a marginal amount, sufficient to ensure that a transponder signal received four antennas away from an active antenna is not acknowledged because the receive window for the non-active antenna is delayed.

9 Claims, 5 Drawing Sheets

(56) References Cited

U.S. PATENT DOCUMENTS

| | | | | |
|---|---|---|---|---|
| 6,081,718 A | * | 6/2000 | Ando | G07B 15/063 340/928 |
| 6,177,861 B1 | * | 1/2001 | MacLellan | G06K 7/0008 340/10.1 |
| 6,219,613 B1 | | 4/2001 | Terrier et al. | |
| 7,253,717 B2 | * | 8/2007 | Armstrong | G06K 7/0008 340/10.2 |
| 7,388,501 B2 | | 6/2008 | Tang et al. | |
| 7,479,896 B2 | * | 1/2009 | Ho | G07B 15/06 340/907 |
| 7,548,153 B2 | * | 6/2009 | Gravelle | G06K 7/0008 340/10.2 |
| 7,817,014 B2 | * | 10/2010 | Krishna | G06K 7/0008 340/10.2 |
| 8,928,462 B2 | | 1/2015 | Gravelle | |
| 9,633,238 B2 | * | 4/2017 | Gravelle | G06K 7/10019 |
| 2009/0200985 A1 | | 8/2009 | Zane et al. | |
| 2009/0231161 A1 | | 9/2009 | Malarky | |
| 2010/0245126 A1 | | 9/2010 | Kohli et al. | |
| 2011/0064159 A1 | | 3/2011 | Ko et al. | |
| 2012/0057535 A1 | | 3/2012 | Zhang et al. | |

* cited by examiner

RFID SYSTEM WITH TIME SLOT INTERLEAVING

CROSS-REFERENCE TO RELATED APPLICATIONS

This utility application claims priority as a Continuation Application under 35 U.S.C. § 120 from Non-provisional application Ser. No. 14/559,038 filed on Dec. 3, 2014, now U.S. Pat. No. 9,633,238, which is a Continuation of Non-provisional application Ser. No. 13/464,542 filed on May 4, 2012, now U.S. Pat. No. 8,928,462, which claims the benefit under 35 U.S.C. § 119(e) of Provisional Application Ser. No. 61/483,568 filed on May 6, 2011, all applications being entitled RFID System with Time Slot Interleaving, and the entire disclosures of which are incorporated by reference herein.

FIELD OF INVENTION

The invention relates to the field of radio frequency identification of vehicles.

BACKGROUND OF THE INVENTION

Automatic Vehicle Identification (AVI) systems implemented using Radio Frequency Identification (RFID) transponders with active transmitters have a tendency for cross-lane reads and writes to occur in multi-lane environments as compared to systems implemented using backscatter technology. Even though RFID reader systems typically have adjustments for reducing the transmitted power and receiver sensitivity, these adjustments may not provide the ability to squelch the response of an active tag in an adjacent lane, or even the response of an active tag two lanes over without degrading overall performance of the system.

BRIEF SUMMARY OF THE INVENTION

In an embodiment, there is disclosed a method of communicating with an active RFID transponder in a system having a plurality transponder reader antennas arranged as a first set of adjacent reader antennas and a second set of adjacent reader antennas and two sets of time slots for sequentially transmitting to the first set of adjacent reader antennas during a first multi-position time slot and to the second set of adjacent reader antennas during a second multi-position time slot. The method includes the steps of: sequentially transmitting a first interrogation signal to each of the first set of adjacent reader antennas during the first multi-position time slot; opening a first receiving window a predetermined time after each of the first interrogation signals, the first receiving window allowing reception of signals only from the one of the first set of reader antennas that just transmitted; sequentially transmitting a second interrogation signal to each of the second set of adjacent reader antennas during the second multi-position time slot; opening a second receiving window a predetermined time after each of the second interrogation signals, the second receiving window allowing reception of signals only from the one of the second set of reader antennas that just transmitted; and delaying the sequential transmission of the second interrogation signal to the second set off reader antennas from the sequential transmission of the first interrogation signal to the first set of the reader antennas, such that the second receive windows of the second set of reader antennas are not aligned in time with the first receive windows of the first set of reader antennas.

In a further embodiment, the first set of reader antennas consists of four reader antennas and the second set of reader antennas consists of four antennas. In a further embodiment, the first set of reader antennas consists of three antennas and the second set of reader antennas consists of three antennas. In a further embodiment, the first set of reader antennas consists of two reader antennas and the second set of reader antennas consists of two antennas. In a further embodiment, the first set of reader antennas is larger or smaller in number than the second set of reader antennas. In a further embodiment the delay is longer than the first interrogation signal.

In a further embodiment, there is disclosed a method of interrogating active RFID transponders including the steps of: transmitting a first interrogation signal from a first antenna and thereafter opening a first acquire window; transmitting a second interrogation signal from a second antenna a predetermined delayed time after the start of the first interrogation signal and thereafter opening a second acquire window; wherein the second interrogation signal is transmitted substantially during the first acquire window. In a further embodiment, the first and second antennas are close enough to an RFID transponder that the transponder can receive the first and the second interrogation signals. In a further embodiment, the first and second antennas are separated by additional antennas and wherein the additional antennas transmit interrogation signals at different times than the first and second interrogation signals.

In a further embodiment, there is disclosed a system for communicating with an active RFID transponder. The system includes: a transponder reader: a first set of adjacent reader antennas; and a second set of adjacent reader antennas. The reader is adapted for sequentially transmitting to the first set of adjacent reader antennas during a first multi-position time slot and to the second set of adjacent reader antennas during a second multi-position time slot such that: a first interrogation signal is sequentially transmitted to each of the first set of adjacent reader antennas during the first multi-position time slot; a first receiving window is opened a predetermined time after each of the first interrogation signals, the first receiving window allowing reception of signals only from the one of the first set of reader antennas that just transmitted; a second interrogation signal is transmitted to each of the second set of adjacent reader antennas during the second multi-position time slot; second receiving window is opened a predetermined time after each of the second interrogation signals, the second receiving window allowing reception of signals only from the one of the second set of reader antennas that just transmitted; the sequential transmission of the second interrogation signal to the second set reader antennas is delayed from the sequential transmission of the first interrogation signal to said first set of the reader antennas, such that the second receive windows of the second set of reader antennas are not aligned in time with the first receive windows of the first set of reader antennas.

DETAILED DESCRIPTION OF PREFERRED EMBODIMENTS OF THE INVENTION

The following description provides a method implemented in an RFID reader system operating with active transmitter tags which allows the interrogator antennas to be closely mounted in-line with minimal adjacent separation, while providing high accuracy and speed performance. This is accomplished by precise overlapping of time division multiplexing (TDM) slots for the active tag, with all readers synchronized with a common synchronization pulse.

The disclosed method allows the effective number of TDM slots to be doubled, with virtually no increase the overall transaction time, and has been developed and implemented in live, high-speed, open-road tolling applications. This approach is particularly applicable in high-speed applications requiring antennas to be mounted in-line with adjacent separations of less than twelve feet and also allows for implementation of a host system that can use "Seen Count" reports from the RFID reader to aid in determining vehicle lane position.

Figure 1:
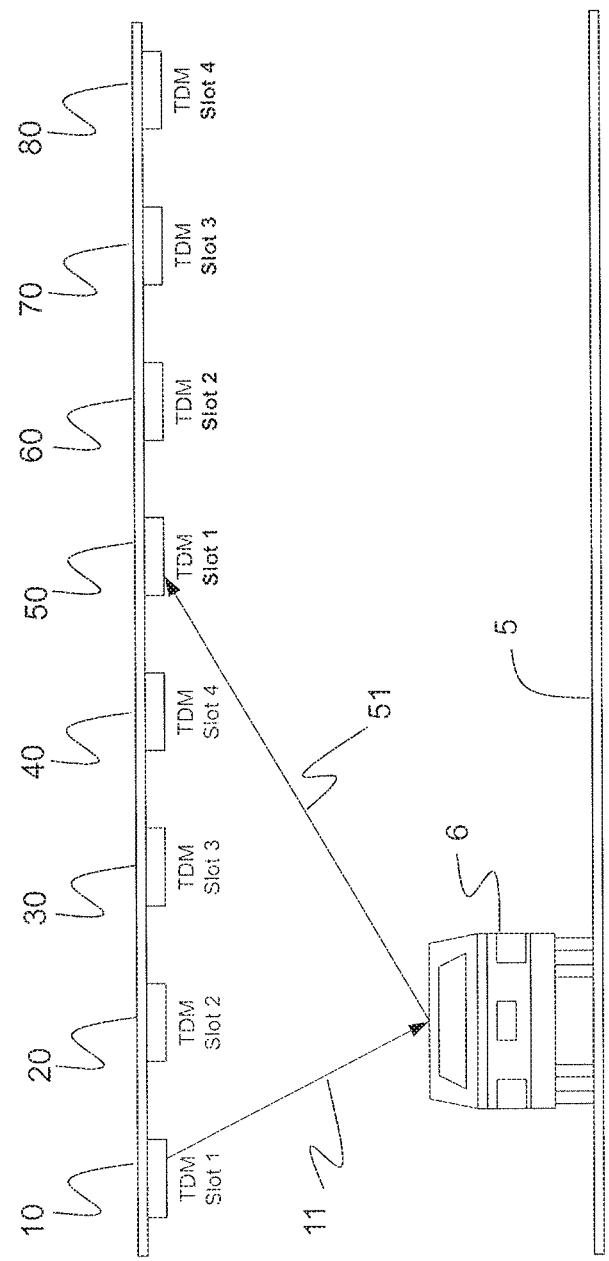
FIG. 1 is a diagram of an exemplary reader system for a four lane toll plaza.

With reference to FIG. 1, the system is deployed in a toll plaza by configuring each reader for one of the eight active tag slots, in sequence across the plaza. In this example there is a reader 10 for lane 1 stripe, a second reader 20 for lane 1, a third reader 30 for lane 2 stripe, a fourth reader 40 for lane 2, a fifth reader 50 for lane 3 stripe, a sixth reader 60 for lane 3, seventh reader 70 for lane 4 stripe and an eighth reader 80 for lane 4. There are also shown a vehicle 6 having an active transmitter tag (not shown), and road surface 5. For plazas with more than 8 readers (not shown), the ninth reader is configured for slot 1, the tenth reader for slot 2, and so on. Consecutive numbering of these slots in the same plaza continues across the center median for readers serving lanes in the opposite direction. The arrangement of reader transmission and reception windows based on time slots is labeled in the Figure. Readers 10 and 50 transmit and receive in TDM Slot 1. Readers 20 and 60 transmit and receive in TDM Slot 2. Readers 30 and 70 transmit and receive in TDM Slot 3 and Readers 40 and 80 transmit and receive in TDM Slot 1. As shown, a response 51 to a request 11 transmitted by the reader 10 in the first lane stripe, can be mistakenly received by the reader 50 in the lane 3 stripe, thus creating a cross-lane read error.

Figure 2:
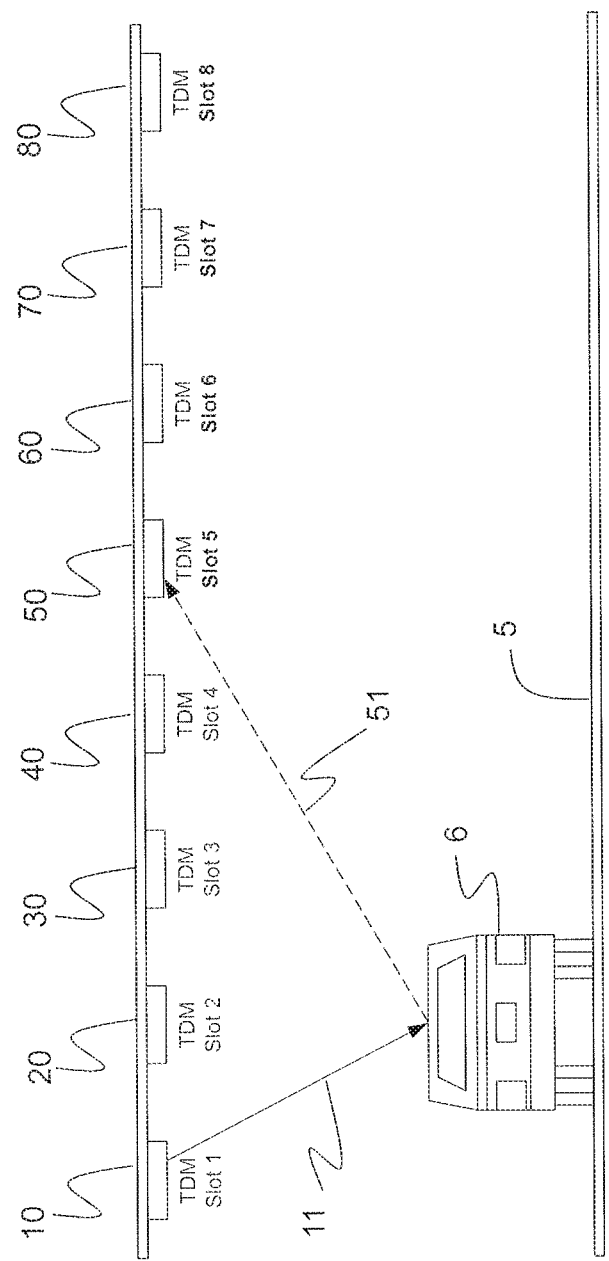
FIG. 2 is a diagram of an exemplary reader system for a four lane toll plaza.

With the same system as FIG. 1 configured for eight active time slots instead of four, as shown in FIG. 2, it is not possible for a reader to receive an inadvertent response 51 from a tag activated 11 by another antenna in the same time slot, because the reader for slot 5 is not active to receive a signal during TDM slot 1.

Figure 3:
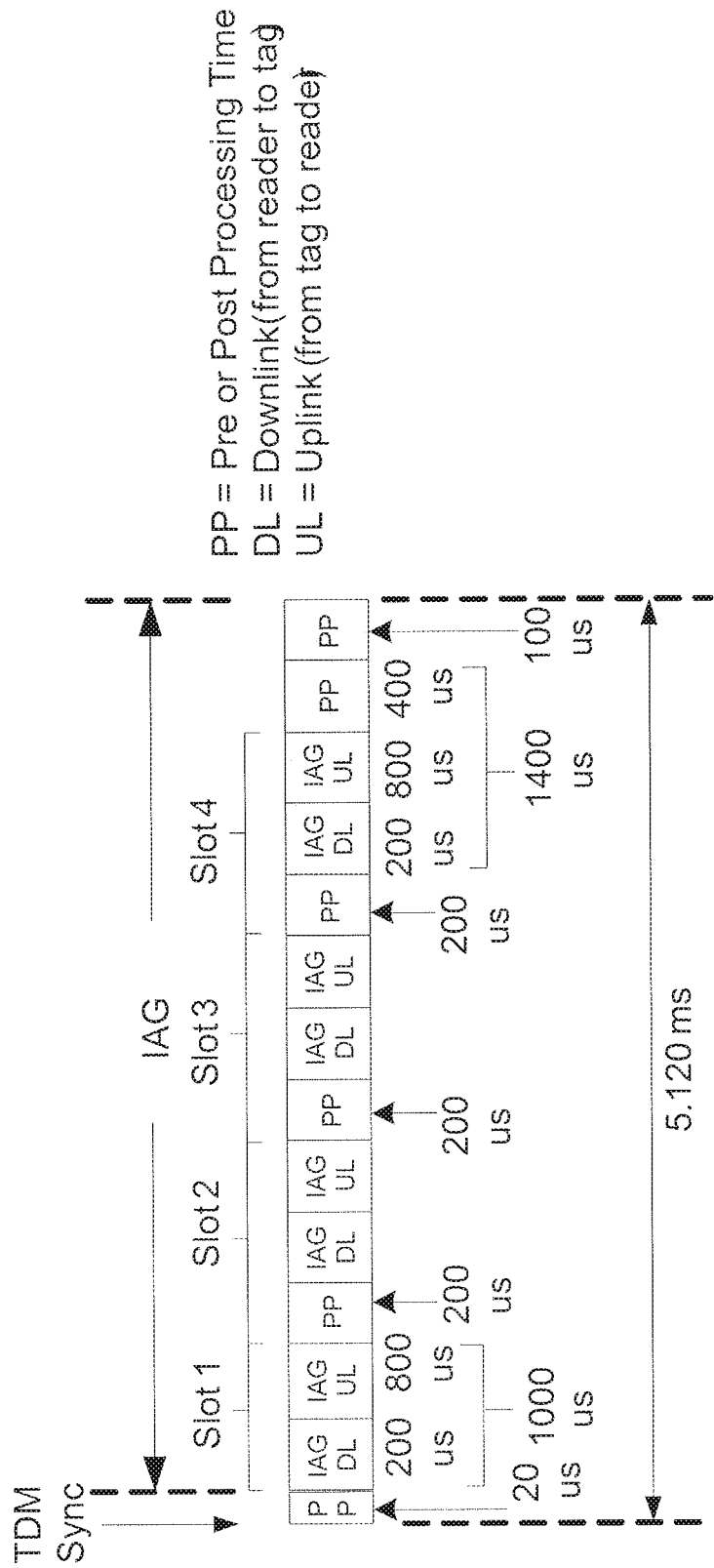
FIG. 3 is an exemplary timing diagram of tag interrogation time slots.
Figure 4:
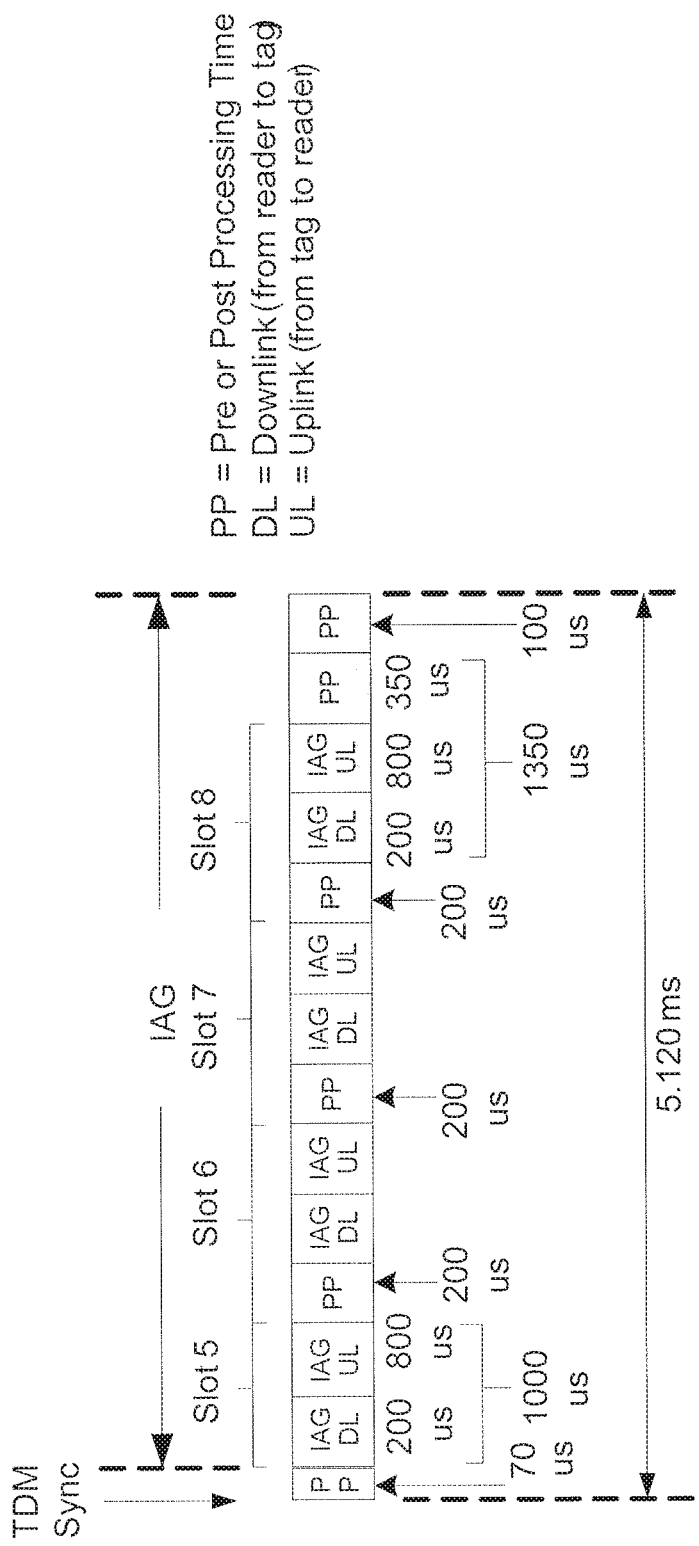
FIG. 4 is an exemplary timing diagram of tag interrogation time slots.

FIGS. 3 and 4 illustrate the timing of an Inter-Agency Group (IAG) active tag protocol for two sets of four TDM timeslots, with FIG. 4 slightly delayed from FIG. 3. Downlink and uplink slots for each TDM slot are labeled DL and UL, respectively and are always 200 and 800 microseconds long, respectively. Note that the IAG slots 1 through 4 essentially overlap with slots 5 through 8 and all eight slots require only 5.120 milliseconds; only 0.050 milliseconds more time than four slots without the second group of four IAG slots overlapped.

As shown in FIG. 4, IAG slots 5 through 8 are delayed from IAG slots 1 through 4 in FIG. 3 by 50 microseconds. This timing shift eliminates the possibility of cross-lane reads between antennas separated by up to eight positions, because a signal received by an antenna four positions away from the active antenna will not be read because the time slot for the receiving signal at the antenna four positions away is shifted from the time slot of the transmitting antenna.

Figure 5:
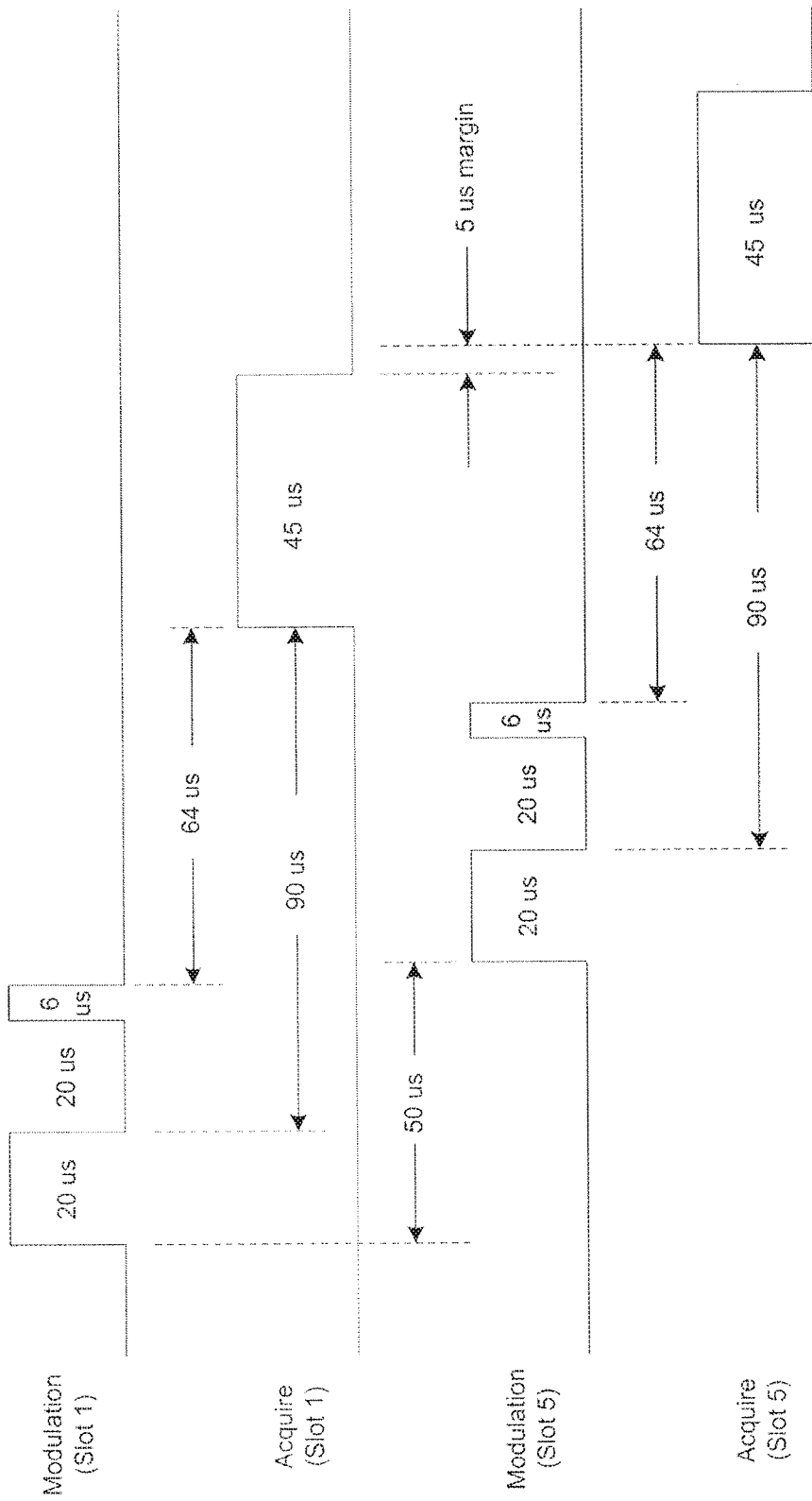
FIG. 5 is an exemplary timing diagram showing timeslot delay between slot 1 and slot 5.

This method of overlapping two groups of time slots is shown in detail in FIG. 5. Note that the acquire window of Slot 1 lies between the 20 microsecond request pulse and the acquire window for Slot 5. This same interlaced timing is implemented between Slots 2 and 6, 3 and 7, and 4 and 8.

While a system with eight readers and two sets of four interlaced timeslots is described above, the invention is not limited to the numbers and timings described in this example. For example a system with four readers having two sets of two interleaved time periods is possible, as is a system with six readers having two sets of three interleaved time periods. Not all possible time slots need to be used, for example a seven reader system using four TDM slots for the first four readers and three additional readers interleaved as described above except that the fourth TDM slot is unused.

Those skilled in the art will recognize other detailed designs and methods that can be developed employing the teachings of the present invention. The examples provided here are illustrative and do not limit the scope of the invention, which is defined by the attached claims.

What is claimed is:

1. An RFID interrogation system comprising:
   a first RFID interrogator;
   a first antenna; and
   a second antenna,
   wherein the first and second antennas located in proximity to each other and wherein the first and second antennas are located to direct signals to and to receive signals from respective first and second interrogation zones,
   wherein a first downlink signal from the first RFID interrogator is transmitted to the first antenna during a first downlink window,
   wherein a first uplink window is opened and after said first downlink window for receiving a signal from a first RFID transponder in the first interrogation zone;
   wherein a second downlink signal from the first RFID interrogator or from a second RFID interrogator is transmitted to the second antenna during a second downlink window,
   wherein the second downlink window occurs after the first downlink window,
   wherein a second uplink window is opened after the second downlink window for receiving a signal from a second RFID transponder in the second interrogation zone,
   wherein the second RFID transponder is different than the first RFID transponder, and wherein:
   said first uplink window comprises a first acquire window,
   said second uplink window comprises a second acquire window,
   said first acquire window occurs after said second downlink signal and said second acquire window occurs after said first acquire window, and
   said first and second acquire windows do not overlap in time.

2. The system of claim 1, wherein said system is configured to assign a signal reception occurring during said first acquire window as a response to said first interrogation signal.

3. The system of claim 1, wherein said system is configured to assign a signal reception occurring during said second acquire window as a response to said second interrogation signal.

4. The system of claim 1 wherein a third antenna is located between said first and second antennas and is located to direct third antenna signals to and to receive signals from a third interrogation zone, wherein said third antenna signals do not overlap in time with said first downlink signal or said second downlink signal.

5. The system of claim 4 wherein a fourth antenna is located adjacent to said second antenna, but not adjacent to said third antenna and is located to direct fourth antenna signals to and to receive signals from a fourth interrogation zone, wherein said fourth antenna signals do not overlap in time with said first downlink signal or said second downlink signal.

6. The system of claim 5 wherein a fifth antenna is located between said second and third antennas and is located to direct fifth antenna signals to and to receive signals from a fifth interrogation zone, wherein said fifth antenna signals do not overlap in time with said first downlink signal or said second downlink signal.

7. The system of claim 6 wherein a sixth antenna is located adjacent to said fourth antenna, but not adjacent to said second antenna and is located to direct sixth antenna signals to and to receive signals from a sixth interrogation zone, wherein said sixth antenna signals do not overlap in time with said first downlink signal or said second downlink signal.

8. The system of claim 1, wherein said first and second interrogation zones are close enough to each other that an RFID transponder can receive both of said first and second downlink signals.

9. The system of claim 1, wherein said first and second antennas are separated by additional antennas and wherein said additional antennas transmit interrogation signals at different times than said first and second interrogation intervals.

* * * * *